(12) United States Patent
Takagi et al.

(10) Patent No.: US 7,849,887 B2
(45) Date of Patent: Dec. 14, 2010

(54) REFRIGERANT TRANSPORTATION HOSE

(75) Inventors: Yuji Takagi, Komaki (JP); Ayumu Ikemoto, Komaki (JP)

(73) Assignee: Tokai Rubber Industries, Ltd., Komaki-shi (JP)

(*) Notice: Subject to any disclaimer, the term of this patent is extended or adjusted under 35 U.S.C. 154(b) by 126 days.

(21) Appl. No.: 11/806,474

(22) Filed: May 31, 2007

(65) Prior Publication Data

US 2007/0277896 A1  Dec. 6, 2007

(30) Foreign Application Priority Data

May 31, 2006 (JP) ............................. 2006-151305
May 28, 2007 (JP) ............................. 2007-140495

(51) Int. Cl.
*F16L 11/00* (2006.01)

(52) U.S. Cl. ...................... 138/137; 138/126; 138/141; 428/36.91

(58) Field of Classification Search ................ 138/137, 138/141, 125, 126; 428/36.91
See application file for complete search history.

(56) References Cited

U.S. PATENT DOCUMENTS

| | | | | |
|---|---|---|---|---|
| 4,593,853 | A | * | 6/1986 | Schad et al. .................. 237/56 |
| 5,084,314 | A | * | 1/1992 | Igarashi et al. ............. 428/36.2 |
| 5,348,779 | A | * | 9/1994 | Igarashi ..................... 428/36.9 |
| 5,576,101 | A | * | 11/1996 | Saitoh et al. ................ 428/332 |
| 6,345,647 | B2 | | 2/2002 | Niki et al. |
| 6,390,140 | B2 | | 5/2002 | Niki et al. |
| 2003/0131899 | A1 | * | 7/2003 | Baba et al. .................. 138/137 |
| 2004/0040609 | A1 | * | 3/2004 | Oishi et al. ................. 138/141 |
| 2004/0118469 | A1 | * | 6/2004 | Wilson et al. ............... 138/137 |
| 2007/0048475 | A1 | * | 3/2007 | Haines ...................... 428/36.91 |
| 2008/0087350 | A1 | * | 4/2008 | Takagi et al. ............... 138/137 |

FOREIGN PATENT DOCUMENTS

| | | |
|---|---|---|
| DE | 4123127 C2 | 1/1993 |
| DE | 69718765 T2 | 10/2003 |
| DE | 102005033271 A1 | 2/2006 |
| EP | 0881419 A1 | 2/1998 |
| EP | 1008605 B1 | 6/2000 |
| EP | 1393889 A1 | 3/2004 |
| EP | 1 420 040 A1 | 5/2004 |
| JP | 7-68659 A | 3/1995 |
| JP | 11-325330 A | 11/1999 |
| JP | 2000-18440 A | 1/2000 |
| JP | 2001-241572 A | 9/2001 |

OTHER PUBLICATIONS

Chinese Office Action dated May 9, 2008, issued in corresponding Chinese Patent Application No. 10 2007 025 089.6-24.
German Office Action dated Oct. 09, 2008 issued in corresponding German Application No.: 10 2007 025 089.6-24.
Rompp Online, Version 3.5, polyvinyl alcohols, status of Mar. 2002.
Office Action dated Oct. 29, 2009 in corresponding German Application No. 2007 025089.6-24.

* cited by examiner

*Primary Examiner*—James F Hook
(74) *Attorney, Agent, or Firm*—Westerman, Hattori, Daniels & Adrian, LLP

(57) ABSTRACT

A refrigerant transportation hose having excellent flexibility and high resistance to permeation of refrigerant. The refrigerant transportation hose includes an innermost layer formed by using polyamide resin, a low-permeation layer formed on an outer peripheral surface of the innermost layer and rubber layers (of an inner rubber layer and an outer rubber layer) formed on an outer peripheral surface of the low-permeation layer, wherein the low-permeation layer is a resin film in thickness of 5 to 100 μm made of polyvinyl alcohol having a degree of saponification of not less than 90%.

11 Claims, 1 Drawing Sheet

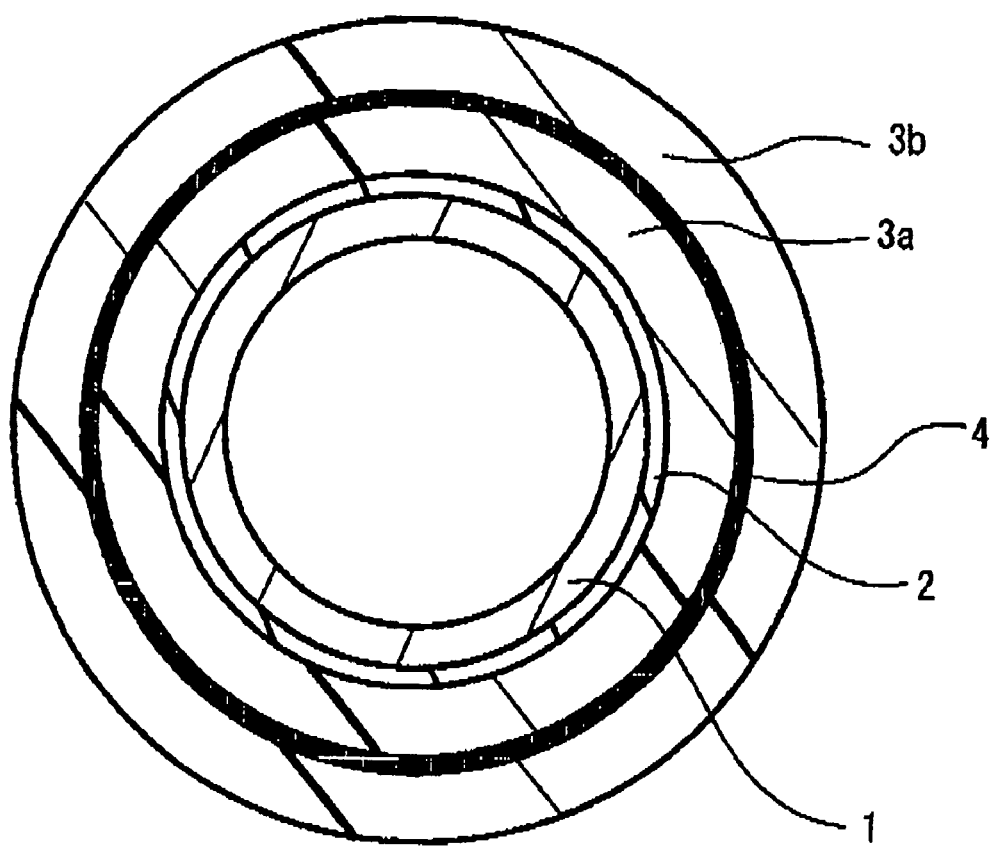
Figure

REFRIGERANT TRANSPORTATION HOSE

BACKGROUND OF THE INVENTION

1. Field of the Invention

The present invention relates to a refrigerant transportation hose such as an air-conditioner hose and specifically to a refrigerant transportation hose, for transporting refrigerant (gas or liquid) such as carbon dioxide ($CO_2$), chlorofluorocarbon (Freon, trademark of Du Pont de Nemours and Company), chlorofluorocarbon's (CFC's) substitute and propane, that is mounted in an engine compartment or the like of an automobile.

2. Description of the Related Art

Generally, a rubber hose is used for a refrigerant transportation hose that is mounted in an engine compartment of an automobile in terms of assembly, flexibility, capability of controlling vibration transmission and the like. For example, proposed is a hose having a structure of a tubular inner rubber layer in which refrigerant is circulated, a reinforcing layer formed on an outer peripheral surface of the tubular inner rubber layer and an outer rubber layer formed on an outer peripheral surface of the reinforcing layer (for example, see Japanese Unexamined Patent Publication No. 07-068659).

To suppress permeation of refrigerant such as chlorofluorocarbon (Freon) or CFC's substitute (such as R134a) or enhance a barrier property against refrigerant, proposed is a hose of which an innermost layer is formed by polyamide resin (PA) or a hose containing metallic foil or metallized laminate (for example, see Japanese Unexamined Patent Publication No. 2001-241572).

Since chlorofluorocarbon (Freon) conventionally used as refrigerant for an air-conditioner of an automobile or the like leads to destruction of an ozone layer in the atmosphere, the use thereof has been already prohibited. Further, restriction of emission reduction is now applying to CFC's substitute such as R134a. Under such circumstances, it is thought that carbon dioxide ($CO_2$) refrigerant (liquid or gas), which may impart less adverse affects on the environment, will be mainly used as refrigerant for air-conditioners in the future.

However, carbon dioxide refrigerant has high permeability as compared with conventional refrigerant such as R134a and thus penetrates even a barrier layer based on polyamide 6 (PA6) effective for conventional refrigerant. For this reason, if a conventional refrigerant transportation hose is used for transporting carbon dioxide refrigerant, cooling capacity is deteriorated.

On the other hand, the hose containing a laminate such as metallic foil has a defect that the laminate tends to peel and thus a low-permeation property of refrigerant gas tends to deteriorate. Further, as a hose excellent in a low-permeation property, for example, proposed is a hose containing an ethylene vinyl alcohol copolymer (EVOH) layer, which, however, tends to be inferior in flexibility.

SUMMARY OF THE INVENTION

In view of such circumstances, it is an object of the present invention to provide a refrigerant transportation hose having excellent flexibility and high resistance to permeation of refrigerant.

To this end, the present invention is a refrigerant transportation hose containing an innermost layer formed by using polyamide resin, a low-permeation layer formed on an outer peripheral surface of the innermost layer and a rubber layer formed on an outer peripheral surface of the low-permeation layer, wherein the low-permeation layer is a resin film in thickness of 5 to 100 µm made of polyvinyl alcohol having a degree of saponification of not less than 90%.

The present inventors have piled intensive studies to solve the above-mentioned problems. During the process, the present inventors found that when a film is formed on an outer peripheral surface of the innermost layer of polyamide resin by using polyvinyl alcohol having a degree of saponification of not less than 90%, resistance to permeation of refrigerant (especially, carbon dioxide refrigerant) is improved, even if the film is thin. Also, they found that the film within a specified range of thickness provides a good balance between the low-permeation property and flexibility of the hose, Further, they found that when a rubber layer is formed on an outer peripheral surface of the film, vibration absorbing property and resistance to mechanical impact from outside become excellent. As a result, they found that the thus obtained hose can exert intended performance as a hose. Thus, they attained the present invention.

As described above, the refrigerant transportation hose of the present invention is provided with an innermost layer formed by using polyamide resin, a low-permeation layer formed on an outer peripheral surface of the innermost layer and a rubber layer formed on an outer peripheral surface of the low-permeation layer, in which the low-permeation layer is a resin film in thickness of 5 to 100 µm made of polyvinyl alcohol having a degree of saponification of not less than 90%. For this reason, even if the refrigerant transportation hose of the present invention has a thin thickness, it can retain an excellent low-permeation property, especially to carbon dioxide so as to suppress deterioration of cooling capacity of an air conditioner or the like due to permeation of refrigerant. Further, since the refrigerant transportation hose of the present invention has excellent flexibility, it is advantageous for pipe arrangement and also advantageous for use as a piping hose in an engine compartment, where vibration is hard, of an automobile.

Especially, when the polyamide resin for forming the innermost layer is polyamide 6, low-permeation property of refrigerant and interlaminar adhesion are further enhanced.

Further, when the rubber layer formed on an outer peripheral surface of the low-permeation layer is formed by butyl rubber, low-permeation property of refrigerant and resistance to water from outside are further enhanced.

Even further, when the innermost layer and the low-permeation layer are intervened by an adhesive layer, which is made of rubber cement adhesive, interlaminar adhesion can be ensured and flexibility of the whole hose can be enhanced.

Still further, when the innermost layer is formed by alloyed polyamide resin, for example, an alloy of polyamide 6 and polyolefin rubber, flexibility can be further enhanced and heat resistance can be increased at the same time.

Even still further, when the alloy contains polyamide 6 at a high ratio or the innermost layer formed by using the alloy is preliminarily heat-treated, interlaminar adhesion of the low-permeation layer and the innermost layer of the present invention can be further improved. Further, when the heat-treatment and cleaning by solvent are conducted, extract and the like exuded on an outer peripheral surface of the innermost layer by the heat treatment can be fully eliminated and thus interlaminar adhesion can be further enhanced.

BRIEF DESCRIPTION OF THE DRAWING

The sole figure of the drawing is a cross section illustrating one embodiment of a refrigerant transportation hose according to the present invention.

DESCRIPTION OF THE PREFERRED EMBODIMENTS

Embodiments of the present invention will be described in detail below.

A refrigerant transportation hose of the present invention which may have a structure, for example, as shown in the figure, is provided with an innermost layer 1 formed by using polyamide resin, a low-permeation layer 2 formed on an outer peripheral surface of the innermost layer 1 and a rubber layer 3 (consisting of an inner rubber layer 3a and an outer rubber layer 3b) on an outer peripheral surface of the low-permeation layer 2, in which the low-permeation layer 2 is a resin film in thickness of 5 to 100 μm made of polyvinyl alcohol having a degree of saponification of not less than 90% In the figure, the rubber layer 3 has a two-layer structure of the inner rubber layer 3a and the outer rubber layer 3b. However, the structure thereof is not specifically limited, and the rubber layer 3 may have a single-layer structure and a multi-layer structure of three or more layers. A reinforcing layer 4 may be provided, as required, as shown in the figure.

The material used for forming the innermost layer 1 is not particularly limited, but examples thereof include polyamide resins such as polyamide 6 (PA6), polyamide 66 (PA66), polyamide 99 (PA99), polyamide 610 (PA610), polyamide 612 (PA612), polyamide 11 (PA11), polyamide 912 (PA912), polyamide 12 (PA12), a copolymer of polyamide 6 and polyamide 66 (PA6/66) and a copolymer of polyamide 6 and polyamide 12 (PA6/12), which may be used either alone or in combination. Among them, polyamide 6 is preferably used in terms of excellent interlaminar adhesion and better low-permeation of refrigerant.

The polyamide resin may be alloyed. Among them, an alloy of polyamide 6 and polyolefin rubber (for example, ethylene-propylene rubber such as EPM and EPDM) is preferably used for forming the innermost layer 1, because it is excellent in flexibility with low flexural modulus and in heat resistance. Specifically, examples thereof include ZYTEL ST811 and ZYTEL ST811HS, both available from Du Pont de Nemours and Company.

When the polyamide resin is alloyed as described above, extract (low-boiling component) existed in the alloy occasionally reaches an inner peripheral surface of the low-permeation layer 2 and stays therein. (Even if an adhesive layer, for example, a rubber cement adhesive layer, is intervened between a innermost layer 1 and a low-permeation layer 2, as described below, such extract may reach an inner peripheral surface of the low-permeation layer 2 and stay therein.) Thereby, delamination may be caused in some cases. In this case, if an innermost layer 1 of the hose is formed by a mixture of the alloy and polyamide 6 at a high ratio blended thereto, or if an innermost layer 1 is formed by using the alloy, and is preliminarily heat-treated (at 100 to 160° C. for 10 to 300 minutes), and is cleaned by solvent (such as toluene), and then each layer is laminated on the innermost layer in order, the fear of delamination due to the above-mentioned extract completely disappears.

The material for forming the innermost layer 1 may contain additives such as a filler, a plasticizer and an antioxidant, as required, in addition to polyamide resin.

In the present invention, the phrase of "material used for forming something" means the case where only the material is used for forming something as well as the case where the material is used in combination with other material for forming something (or the case where the material is alloyed with other material), in which the ratio of the other materials is generally less than 50% by weight.

The material used for forming the low-permeation layer 2 formed on an outer peripheral surface of the innermost layer 1 is, as mentioned above, polyvinyl alcohol (PVOH) having a degree of saponification of not less than 90%. This is because when the polyvinyl alcohol has a degree of saponification of less than 90%, a desired level of low-permeation property particularly for carbon dioxide refrigerant cannot be obtained. The degree of saponification of polyvinyl alcohol herein can be obtained by applying each value of m and n of the following chemical formula (1) representing polyvinyl alcohol to the following mathematical formula (a).

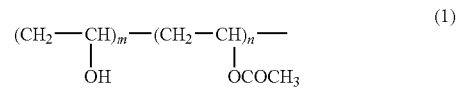

$$(CH_2-CH)_m-(CH_2-CH)_n- \atop \phantom{xxxxx}| \phantom{xxxxxxxxxx} | \atop \phantom{xxxx}OH \phantom{xxxxxxx} OCOCH_3 \tag{1}$$

$$\text{Degree of saponification: } [m/(m+n)] \times 100 \tag{a}$$

The material for forming the low-permeation layer 2 is prepared for use as a coating liquid by dissolving thereof into water or alcohol such as methanol, ethanol or isopropyl alcohol. Especially, water (hot water of 90° C. to 95° C.) is preferred as a solvent in terms of solubility of the material for forming the low-permeation layer 2. It is preferred that the thus obtained coating liquid has a viscosity of 10 to 1000000 (mPa·s/25° C.) in terms of coating properties such as wettability and workability.

The material for forming the rubber layer (consisting of the inner rubber layer 3a and the outer rubber layer 3b) formed on an outer peripheral surface of the low-permeation layer 2 is not specifically limited, however a blend of rubber material and other materials, appropriately added thereto, such as a vulcanizing agent and carbon black is used. Examples of the rubber material include butyl rubber (IIR), halogenated butyl rubber such as chlorinated butyl rubber (Cl-IIR) and brominated butyl rubber (Br-IIR), acrylonitrile-butadiene rubber (NBR), chloroprene rubber (CR), ethylene-propylene-diene rubber (EPDM), ethylene-propylene rubber (EPM), fluorocarbon rubber (FKM), epichlorohydrin rubber (ECO), acrylic rubber, silicone rubber, chlorinated polyethylene rubber (CPE) and urethane rubber. Among them, butyl rubber (IIR) is preferably used because low-permeation property of refrigerant and resistance to water from outside are further enhanced.

Further, the above-mentioned rubber layer 3 has a two-layer structure of the inner rubber layer 3a and the outer rubber layer 3b, as shown in the figure. When the rubber layer 3 has multiple layers in this manner, the materials for forming each layer may be the same or different from each other. Further, a reinforcing layer 4 may be formed, as required, as shown in the figure. The reinforcing layer 4 is preferably intervened between the inner rubber layer 3a and the outer rubber layer 3b so as to fully exhibit its performance. The reinforcing layer 4 is formed by braiding such as spiral winding, braiding and knitting of reinforcing fibers such as a polyethylene terephthalate (PET) fiber, a polyethylene naphthalate (PEN) fiber, an aramid fiber, a polyamide (nylon) fiber, a polyvinyl alcohol (vinylon) fiber, a rayon fiber and a metallic wire.

The refrigerant transportation hose of the present invention, as shown in the figure, may be manufactured in the following manner. First, the material for forming an innermost layer 1 and the material (coating liquid) for forming a low-permeation layer 2 are each prepared. Then, the material for forming the innermost layer 1 is extruded into a hose shape so as to form a tube of the innermost layer 1. At that time, a mandrel can be used. Next, the coating liquid for forming the low-permeation layer 2 is coated onto an outer peripheral surface of the innermost layer 1. The coating method is not specifically limited and the conventional methods such as a dipping method, a spraying method, a roll coating method and a brushing method may be used. The low-permeation layer (resin coat) 2 having a specified thickness is formed by drying after coating. After forming the low-permeation layer 2 in this manner, a rubber layer is formed by extrusion on an outer peripheral surface of the low-permeation layer 2, and a reinforcing layer 4 is formed, as required. (In the figure, an inner rubber layer 3a is formed on an outer peripheral surface of the low-permeation layer 2, a reinforcing layer 4 is formed on an outer peripheral surface of the inner rubber layer 3a, and then an outer rubber layer 3b is formed on an outer peripheral surface of the reinforcing layer 4.) Thus, the refrigerant transportation hose having the intended layer structure can be manufactured.

Prior to formation of the low-permeation layer 2 by coating, the outer peripheral surface of the innermost layer 1 may be subjected to a pre-treatment such as ultraviolet treatment, plasma treatment or corona discharge treatment for adhesion. Among them, it is preferred that the outer peripheral surface of the innermost layer 1 is roughened by plasma treatment and then the low-permeation layer 2 is directly formed on the roughened surface because the coat adhesion (interlaminar adhesion) is improved.

Further, an adhesive layer may be formed on an outer peripheral surface of the innermost layer 1 before coating the material for forming the low-permeation layer 2. The material for forming the adhesive layer is not specifically limited. Examples thereof include urethane adhesive, polyester adhesive, isocyanate adhesive, an epoxy adhesive and rubber cement adhesive, which may be used either alone or in combination. Among them, urethane adhesive and rubber cement adhesive are preferably used in terms of excellent interlaminar adhesion between the innermost layer 1 and the low-permeation layer 2. When the rubber cement adhesive is used, flexibility of the whole hose can be increased.

In the refrigerant transportation hose of the present invention, an inner diameter is preferably 5 to 40 mm and a thickness of the innermost layer 1 is preferably 0.02 to 2.0

According to the present invention, the thickness of the low-permeation layer 2 should be 5 to 100 μm. When the thickness of the low-permeation layer 2 is less than 5 μm, low-permeation property of the refrigerant is inferior. When the thickness of the low-permeation layer 2 is over 100 μm, a coating film becomes hard so as to pose a problem in terms of flexibility of the resultant hose, which may cause a crack.

The thickness of the rubber layer formed on an outer peripheral surface of the low-permeation layer 2 is not specifically limited. However, when the rubber layer 2 has a two-layer structure of an inner rubber layer 3a and the outer rubber layer 3b, as shown in the figure, the thickness of the inner rubber layer 3a is preferably 0.5 to 5 mm and the thickness of the outer rubber layer 3b is preferably 0.5 to 2.0 mm.

The refrigerant transportation hose of the present invention is applicable to a transportation hose of refrigerant such as carbon dioxide, chlorofluorocarbon, CFC's substitute and propane and the like to be used for air conditioners, radiators or the like. Among them, the refrigerant transportation hose of the present invention is preferably used as a transportation hose of carbon dioxide refrigerant. Further, the refrigerant transportation hose of the present invention is applicable to automotive vehicles as well as other transport machinery including aircraft; vehicles for industrial use such as a forklift, a wheeled tractor shovel, and a crawler crane; and railroad vehicles.

Examples of the present invention will be described below in conjunction with Comparative Examples. However, it should be noted that the present invention is not limited to the Examples.

EXAMPLE 1

A tubular innermost layer (thickness: 0.15 mm) was formed by extruding PA6 (NYLON 6 1030B available from UBE INDUSTRIES, LTD.) into a hose shape onto a TPX (synthetic resin)-made mandrel having an outer diameter of 8 mm. Then, an outer peripheral surface of the innermost layer was subjected to a plasma treatment so as to be roughened. Successively, an urethane adhesive layer having a thickness of 1 μm was formed on the roughened surface of the innermost layer and was dipped with a coating liquid (viscosity: 500 mPa·s/25° C.) obtained by dissolving polyvinyl alcohol (PVOH) having a saponification degree of 99% (GOHSENOL N-300 available from Nippon Synthetic Chemical Industry Co., Ltd.) into hot water of 90° C. Then, the thus laminated hose body was charged into a drying oven for drying, so that a coating layer (thickness; 10 μm) was formed. An inner rubber layer (thickness: 1.6 mm) was formed by extruding butyl rubber on an outer peripheral surface of the coating layer, and a reinforcing layer was formed by braiding aramid fibers on an outer peripheral surface of the inner rubber layer, and then an outer rubber layer (thickness: 1.0 mm) was formed by extruding EPDM on an outer peripheral surface of the reinforcing layer. After being vulcanized, the mandrel was withdrawn from the laminated hose body and the intended refrigerant transportation hose was obtained by cutting off the thus produced product of continuous length (see the figure).

EXAMPLE 2

The intended refrigerant transportation hose was produced in the same manner as in EXAMPLE 1 except that the thickness of the coating (PVOH) layer was 100 μm.

EXAMPLE 3

The intended refrigerant transportation hose was produced in the same manner as in EXAMPLE 1 except that the thickness of the coating (PVOH) layer was 5 μm.

EXAMPLE 4

The intended refrigerant transportation hose was produced in the same manner as in EXAMPLE 1 except that PVOH having a saponification degree of 90% (GOHSENOL AH-17 available from Nippon Synthetic Chemical Industry Co., Ltd.) was used for forming a coating (PVOH) layer and the thickness of the coating (PVOH) layer was 5 μm.

EXAMPLE 5

The intended refrigerant transportation hose was produced in the same manner as in EXAMPLE 1 except that rubber cement adhesive was used instead of urethane adhesive for forming the adhesive layer.

EXAMPLE 6

The intended refrigerant transportation hose was produced in the same manner as in EXAMPLE 1 except that a blend of PA6 (NYLON 6 1030B available from UBE INDUSTRIES, LTD.) and an alloy of PA6 (ZYTEL ST811HS available from Du Pont de Nemours and Company) at a weight ratio of 75/25 was used for forming the innermost layer and rubber cement adhesive was used instead of urethane adhesive for forming the adhesive layer.

EXAMPLE 7

The intended refrigerant transportation hose was produced in the same manner as in EXAMPLE 1 except that a blend of PA6 (NYLON 6 1030B available from UBE INDUSTRIES, LTD.) and an alloy of PA6 (ZYTEL ST811HS available from Du Pont de Nemours and Company) at a weight ratio of 50/50 was used for forming the innermost layer and rubber cement adhesive was used instead of urethane adhesive for forming the adhesive layer.

EXAMPLE 8

The intended refrigerant transportation hose was produced in the same manner as in EXAMPLE 1 except that a blend of PA6 (NYLON 6 1030B available from UBE INDUSTRIES, LTD.) and an alloy of PA6 (ZYTEL ST811HS available from Du Pont de Nemours and Company) at a weight ratio of 25/75 was used for forming the innermost layer and rubber cement adhesive was used instead of urethane adhesive for forming the adhesive layer.

EXAMPLE 9

The intended refrigerant transportation hose was produced in the same manner as in EXAMPLE 1 except that an alloy of PA6 (ZYTEL ST811HS available from Du Pont de Nemours and Company) was used for forming the innermost layer and rubber cement adhesive was used instead of urethane adhesive for forming the adhesive layer.

EXAMPLE 10

The intended refrigerant transportation hose was produced in the same manner as in EXAMPLE 1 except that an alloy of PA6 (ZYTEL ST811HS available from Du Pont de Nemours and Company) was used for forming the innermost layer, and the thus obtained innermost layer was heat-treated in an oven (at 150° C. for 1 hour), and then an outer peripehral surface thereof was cleaned by toluene, and rubber cement adhesive was used instead of urethane adhesive for forming the adhesive layer.

EXAMPLE 11

The intended refrigerant transportation hose was produced in the same manner as in EXAMPLE 1 except that an alloy of PA6 (ZYTEL ST811HS available from Du Pont de Nemours and Company) was used for forming the innermost layer, and the thus obtained innermost layer was heat-treated in an oven (at 150° C. for 5 hours), and then an outer peripheral surface thereof was cleaned by toluene, and rubber cement adhesive was used instead of urethane adhesive for forming the adhesive layer.

COMPARATIVE EXAMPLE 1

The intended refrigerant transportation hose was produced in the same manner as in EXAMPLE 1 except that PVOH having a saponification degree of 86% (GOHSENOL GH-17 available from Nippon Synthetic Chemical Industry Co., Ltd. was used for forming a coating (PVOH) layer and the thickness of the coating (PVOH) layer was 5 µm.

COMPARATIVE EXAMPLES 2

The intended refrigerant transportation hose was produced in the same manner as in EXAMPLE 1 except that the thickness of the coating (PVOH) layer was 101 µm.

COMPARATIVE EXAMPLES 3

The intended refrigerant transportation hose was produced in the same manner as in EXAMPLE 1 except that the thickness of the coating (PVOH) layer was 2 µm.

COMPARATIVE EXAMPLES 4

The intended refrigerant transportation hose was produced in the same manner as in EXAMPLE 1 except that the coating (PVOH) layer was not formed.

Properties of the hoses produced in accordance with the EXAMPLES and the COMPARATIVE EXAMPLES were evaluated in the following manners. The results of the evaluations are also shown in Table 1.

$CO_2$ Permeation Property

Carbon dioxide ($CO_2$) was encapsulated in the hose at a low temperature (not more than −35° C.), and both open ends were sealed, and then the hose was allowed to stand in an oven of 90° C. in such a state. The decrease amount of carbon dioxide in the hose was plotted with time. The permeation amount (permeability constant; $(mg \cdot mm)/(cm^2 \cdot day)$) of $CO_2$ per day on the permeation area of the hose was calculated by inclination of the curve. Each permeation amount was indicated by a relative index as regarded the permeation amount of the Comparative Example 4 where a PVOH layer was not formed as 100. When the index is not more than 50, the evaluation was good (○), while when the index is over 50, the evaluation was poor (X).

Film Formability

After coating PVOH aqueous solution, film formability was evaluated by visual observation. When cissing and air bubbles were not observed, the evaluation was good (○), while when cissing and air bubbles were observed, the evaluation was poor (X).

Cracking Properties

Cracking properties were evaluated by using each tube of EXAMPLES and COMPARATIVE EXAMPLES in a state that a coating (PVOH) layer was formed on an outer peripheral surface of an innermost (PA6) layer and then dried before an inner rubber layer, a reinforcing layer and an outer rubber layer were formed. When each tube was bent by 90° and abnormalities such as a crack or peel were observed on the coating (PVOH) layer, the evaluation was poor (X). When each tube was bent by 90° and abnormalities such as a crack or peel were not observed on the coating (PVOH) layer, the evaluation was good (○).

Interlaminar Adhesion

Both open ends of the hose were closed in a state that $CO_2$ was sealed into the hose at a low temperature (not more than −35° C.) and was allowed to stand in an oven at 90° C. The hose was withdrawn from the oven after 24 hours, $CO_2$ of the hose was released at once by opening both ends thereof. Thereafter, the hose was halved lengthwise, peel force between the inner layer and the coating (PVOH) layer was obtained by measuring peel strength of 180 degrees at a pulling rate of 50 mm/min by means of a tensile tester. Those having values of less than 3 N/inch (7.6 N/cm) were evaluated as poor (X), those having values of 3 to 20 N/inch (7.6 to 50.8 N/cm) were evaluated as fair (○), and values of more than 20 N/inch were evaluated as good (◎).

TABLE 1

| | Example | | | | | | | |
|---|---|---|---|---|---|---|---|---|
| | 1 | 2 | 3 | 4 | 5 | 6 | 7 | 8 |
| Resistance to $CO_2$ permeation | | | | | | | | |
| Index | 9 | 1 | 15 | 25 | 9 | 9 | 9 | 9 |
| Evaluation | ○ | ○ | ○ | ○ | ○ | ○ | ○ | ○ |
| Film formability | ○ | ○ | ○ | ○ | ○ | ○ | ○ | ○ |
| Cracking properties | ○ | ○ | ○ | ○ | ○ | ○ | ○ | ○ |
| Interlaminar adhesion | ◎ | ◎ | ◎ | ◎ | ◎ | ◎ | ○ | ○ |

TABLE 2

| | Example | | | Comparative Example | | | |
|---|---|---|---|---|---|---|---|
| | 9 | 10 | 11 | 1 | 2 | 3 | 4 |
| Resistance to $CO_2$ permeation | | | | | | | |
| Index | 9 | 9 | 9 | 65 | 1 | 90 | 100 |
| Evaluation | ○ | ○ | ○ | X | ○ | X | X |
| Film formability | ○ | ○ | ○ | ○ | ○ | X | — |
| Cracking properties | ○ | ○ | ○ | ○ | X | ○ | — |
| Interlaminar adhesion | ○ | ◎ | ◎ | ○ | ○ | ○ | — |

The results demonstrated that cracks were difficult to occur in the hoses of the EXAMPLES because the hoses of EXAMPLES had high flexibility, and also that $CO_2$ permeation amount could be remarkably decreased as compared with the hoses of the COMPARATIVE EXAMPLES.

The refrigerant transportation hose of the present invention is preferably applicable to transportation hoses for transporting refrigerant such as carbon dioxide ($CO_2$), chlorofluorocarbon, CFC's substitute and propane used in air conditioners, radiators or the like.

What is claimed is:

1. A refrigerant transportation hose comprising an innermost layer formed by using polyamide resin, an adhesive layer formed on an outer peripheral surface of the polyamide resin of the innermost layer, a low-permeation layer formed on an outer peripheral surface of the adhesive layer and a rubber layer formed on an outer peripheral surface of the low-permeation layer, wherein the low-permeation layer is a resin film in thickness of 5 to 100 μm made of polyvinyl alcohol having a degree of saponification of not less than 90% and wherein the adhesive layer is formed of at least one selected from the group consisting of urethane adhesive, polyester adhesive, isocyanate adhesive, epoxy adhesive and rubber cement adhesive.

2. The refrigerant transportation hose according to claim 1, wherein the polyamide resin for forming the innermost layer is polyamide 6.

3. The refrigerant transportation hose according to claim 1, wherein the rubber layer is formed by butyl rubber.

4. The refrigerant transportation hose according to claim 1, wherein the adhesive layer is formed by urethane adhesive or rubber cement adhesive.

5. The refrigerant transportation hose according to claim 1, wherein an outer peripheral surface of the innermost layer is roughened by plasma treatment.

6. The refrigerant transportation hose according to claim 1, wherein the refrigerant is carbon dioxide ($CO_2$).

7. A refrigerant transportation hose comprising an innermost layer formed by using an alloyed polyamide resin, an adhesive layer formed on an outer peripheral surface of the innermost layer, a low-permeation layer formed on an outer peripheral surface of the adhesive layer and a rubber layer formed on an outer peripheral surface of the low-permeation layer, wherein the low-permeation layer is a resin film in thickness of 5 to 100 μm made of polyvinyl alcohol having a degree of saponification of not less than 90%, and wherein the adhesive layer is formed of at least one selected from the group consisting of urethane adhesive, polyester adhesive, isocyanate adhesive, epoxy adhesive and rubber cement adhesive.

8. The refrigerant transportation hose according to claim 7, wherein the alloy is an alloy of polyamide 6 and polyolefin rubber.

9. The refrigerant transportation hose according to claim 7, wherein the innermost layer is formed by a mixture of the alloy and polyamide 6 at a high ratio blended thereto.

10. A refrigerant transportation hose comprising an innermost layer formed by using an alloyed polyamide resin, an adhesive layer formed on an outer peripheral surface of the innermost layer, a low-permeation layer formed on an outer peripheral surface of the adhesive layer and a rubber layer formed on an outer peripheral surface of the low-permeation layer, wherein the innermost layer formed by using the alloyed polyamide resin is preliminarily heat-treated, wherein the low-permeation layer is a resin film in thickness of 5 to 100 μm made of polyvinyl alcohol having a degree of saponification of not less than 90%, and wherein the adhesive layer is formed of at least one selected from the group consisting of urethane adhesive, polyester adhesive, isocyanate adhesive, epoxy adhesive and rubber cement adhesive.

11. A refrigerant transportation hose comprising an innermost layer formed by using an alloyed polyamide resin, an adhesive layer formed on an outer peripheral surface of the innermost layer, a low-permeation layer formed on an outer peripheral surface of the adhesive layer and a rubber layer formed on an outer peripheral surface of the low-permeation layer, wherein the innermost layer formed by using the alloyed polyamide resin is preliminarily heat-treated and is cleaned by solvent, wherein the low-permeation layer is a resin film in thickness of 5 to 100 μm made of polyvinyl alcohol having a degree of saponification of not less than 90%, and wherein the adhesive layer is formed of at least one selected from the group consisting of urethane adhesive, polyester adhesive, isocyanate adhesive, epoxy adhesive and rubber cement adhesive.

* * * * *